United States Patent
Kirschstein et al.

(10) Patent No.: US 11,293,522 B2
(45) Date of Patent: Apr. 5, 2022

(54) WORM SHAFT ARTICULATION CONTROL METHOD FOR EPS WORM GEARS

(71) Applicant: TRW Automotive GmbH, Alfdorf (DE)

(72) Inventors: Stefan Kirschstein, Cologne (DE); Toni Müller, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 281 days.

(21) Appl. No.: 16/578,452

(22) Filed: Sep. 23, 2019

(65) Prior Publication Data
US 2020/0102002 A1    Apr. 2, 2020

(30) Foreign Application Priority Data
Sep. 27, 2018   (DE) .......................... 102018123960.2

(51) Int. Cl.
*F16H 57/021*  (2012.01)
*F16H 1/16*    (2006.01)
(Continued)

(52) U.S. Cl.
CPC .............. *F16H 1/16* (2013.01); *F16H 57/021* (2013.01); *B62D 3/12* (2013.01); *B62D 5/0409* (2013.01);
(Continued)

(58) Field of Classification Search
CPC .. F16H 1/16; F16H 57/021; F16H 2057/0213; F16H 2057/0222;
(Continued)

(56) References Cited

U.S. PATENT DOCUMENTS

| | | | | |
|---|---|---|---|---|
| 4,827,790 A | * | 5/1989 | Bisiach | ..................... F16H 1/16 74/398 |
| 6,708,796 B2 | * | 3/2004 | Kinme | .................. F16H 57/021 180/444 |

(Continued)

FOREIGN PATENT DOCUMENTS

| | | |
|---|---|---|
| DE | 10161715 A1 | 6/2003 |
| DE | 602004003077 T2 | 5/2007 |
| DE | 102010000851 A1 | 7/2011 |

*Primary Examiner* — David M Fenstermacher
(74) *Attorney, Agent, or Firm* — Robert James Harwood

(57) ABSTRACT

An electric power steering system with a worm gear includes a worm shaft and a worm wheel, wherein an electric motor is associated with the worm shaft, which is connected to the worm shaft in a force-transmitting manner. A bearing element, arranged on the worm shaft at the end of the worm shaft facing away from the electric motor, is received in a guide bush, wherein the guide bush has, on its circumferential side, a passage opening. It is provided a pre-tensioning device comprising a spring-loaded actuator element extending through the passage opening of the guide bush and acting on the worm shaft in the direction of the worm wheel with a defined pre-tensioning force (K), wherein the pre-tensioning device comprises a limiting device which is adapted to limit a pivoting movement that displaces the worm wheel away from the worm shaft. Furthermore, it is proposed a method for the production of steering systems and a test system for performing the method.

20 Claims, 7 Drawing Sheets

(51) Int. Cl.
*B62D 5/04* (2006.01)
*B62D 3/12* (2006.01)
*F16H 57/022* (2012.01)
*F16H 57/12* (2006.01)

(52) U.S. Cl.
CPC .......... *B62D 5/0454* (2013.01); *B62D 5/0496* (2013.01); *F16H 2057/0213* (2013.01); *F16H 2057/0222* (2013.01); *F16H 2057/127* (2013.01)

(58) Field of Classification Search
CPC ... F16H 2057/127; B62D 3/12; B62D 5/0496; B62D 5/0409; B62D 5/0454
See application file for complete search history.

(56) References Cited

U.S. PATENT DOCUMENTS

| | | | | |
|---|---|---|---|---|
| 6,761,244 B2 * | 7/2004 | Sano | ................... | B62D 5/0409 180/444 |
| 7,721,616 B2 * | 5/2010 | Augustine | ............. | F16F 15/022 74/352 |
| 8,001,866 B2 * | 8/2011 | Song | ................... | B62D 5/0409 74/409 |
| 8,813,904 B2 * | 8/2014 | Hamakita | ............... | F16H 55/24 180/444 |
| 9,671,011 B2 * | 6/2017 | Kimijima | ................ | F16H 57/12 |
| 10,054,194 B2 * | 8/2018 | Kwon | ..................... | F16H 55/24 |
| 2004/0210365 A1 * | 10/2004 | Tanaka | ...................... | F16F 1/32 701/41 |
| 2007/0163374 A1 * | 7/2007 | Yamazaki | ............... | F16C 27/04 74/409 |
| 2007/0205039 A1 * | 9/2007 | Imagaki | .................. | F16C 27/04 180/444 |
| 2008/0041178 A1 * | 2/2008 | Ozsoylu | ................. | F16H 55/24 74/425 |
| 2012/0067151 A1 * | 3/2012 | Kikuchi | .................. | F16H 55/06 74/425 |
| 2014/0083794 A1 * | 3/2014 | Ishii | ..................... | B62D 5/0409 180/444 |
| 2015/0204390 A1 * | 7/2015 | Kimes | .................... | F16D 41/14 192/84.8 |
| 2017/0050667 A1 * | 2/2017 | Strobel | ................ | B62D 5/0409 |
| 2020/0208735 A1 * | 7/2020 | Guerin | .................... | F16H 57/12 |

* cited by examiner

WORM SHAFT ARTICULATION CONTROL METHOD FOR EPS WORM GEARS

CROSS-REFERENCE TO RELATED APPLICATIONS

This application claims priority to German Patent Application No. 102018123960.2, filed 27 Sep. 2018, the disclosure of which is incorporated herein by reference in its entirety.

TECHNICAL FIELD

The present disclosure relates to an electric power steering system, a method for the production of steering systems, and a test system for performing the method.

BACKGROUND

Known from the prior art, electric power steering systems comprise a worm gear, via which an auxiliary motor of the steering system is connected to a steering column or to a rack of the steering system in a force-transmitting manner. Accordingly, this includes a power steering comprising a steering column drive or rack and pinion drive.

Usually a worm shaft of the worm gear is pivotally mounted at an associated end of the electric motor, wherein the pivoting movement essentially takes place in a plane defined by a worm wheel of the worm gear. A free end of the worm shaft can be acted on by a pre-tensioning device having a pre-tensioning force in the direction of the worm wheel to keep the worm shaft and the worm wheel engaged.

In the operation of the worm gear there are forces that create a pivoting movement that displaces the worm wheel away from the worm shaft. These forces are, for example, caused by a ride on uneven road, and by the corresponding engagement forces between the worm shaft and worm wheel. These pivoting movements can in turn give rise to disturbing noises and/or, at least with a certain frequency of disturbances, cause the worm shaft and the worm wheel to become disengaged.

SUMMARY

The purpose of the invention is to provide an electric power steering system, in which the disadvantages from the prior art are rectified.

The purpose is achieved according to the invention through an electric power steering system with a worm gear, comprising a worm shaft and a worm wheel, wherein an electric motor is associated with the worm shaft, which is connected to the worm shaft in a force-transmitting manner. A bearing element, arranged on the worm shaft at the end of the worm shaft facing away from the electric motor, is received in a guide bush, wherein the guide bush has, on its circumferential side, a passage opening. It is provided a pre-tensioning device comprising a spring-loaded actuator element extending through the passage opening of the guide bush and acting on the worm shaft in the direction of the worm wheel with a defined pre-tensioning force, wherein the pre-tensioning device comprises a limiting device which is adapted to limit a pivoting movement that displaces the worm wheel away from the worm shaft. A maximum amplitude of the pivoting movement of the worm shaft is referred hereinafter to as the clearance of the worm shaft.

The limiting device defines the clearance of the worm shaft. The clearance is set in a manner that the worm shaft and the worm wheel are not disengaged. The limiting device thus guarantees that a reliable power transmission is always performed from the electric motor to the worm wheel. Furthermore, the defined pre-tensioning force avoids disturbing noises that can occur during operation of the steering system. However, due to the limiting device, the pre-tensioning force can be reduced by comparison with the prior art, by means of which the friction between the worm shaft and worm wheel is reduced, thus the steering feel is improved.

The worm wheel is coupled to a steering column or a rack of the steering system in a force-transmitting manner; therefore, this includes an electric power steering system with a steering column drive or rack and pinion drive.

Preferably, the limiting device and the actuator element each comprise an abutment, wherein the abutments being in mutual contact limit the pivoting movement that displaces the worm wheel away from the worm shaft. A distance between the abutments (measured while the steering system is in a state, in which the worm shaft is maximally deflected due to the pre-tensioning force and in which the electric motor does not act on the worm shaft with a force) defines the clearance of the worm shaft with respect to the pivoting movement.

Further, preferably a distance between the abutments is essentially equal to the deflection of the worm shaft due to the defined pre-tensioning force. In this case, the distance is measured while the steering system is in a state, in which the worm shaft is maximally deflected due to the pre-tensioning force and in which the electric motor does not act on the worm shaft with a force. It has been proved that this distance set between the abutments is particularly advantageous with respect to the development of disturbing noises. Furthermore, the pivoting movement of the worm shaft is limited to a range in which the worm shaft and the worm wheel are always engaged. Then, the power transmission from the electric motor to the worm wheel is always guaranteed.

One aspect of the invention provides that the distance between the abutments is set based on an ambient temperature and/or ambient humidity, in particular, based on an expected ambient temperature profile and/or an expected ambient humidity profile. The worm shaft and/or the worm wheel can expand or contract depending on the temperature and ambient humidity, by means of which the clearance of the worm shaft is changed. When setting a suitable distance between the abutments, the influence of these ambient parameters is reduced or even eliminated. When referring to the expected ambient temperature profile and the expected ambient humidity profile, for example, it means the temperature or humidity profile of a territorial area in which the steering system is to be used, i.e., the vehicle is to be driven. In other words, the clearance of the worm shaft is adjusted to a local weather zone.

According to a further aspect of the invention, the worm wheel consists of a plastic material, wherein a relative humidity of the plastic material is acclimatized to an expected ambient humidity, in particular, to the expected ambient humidity profile. As a result, it is avoided that the relative humidity of the plastic increases and/or a decreases; therefore, the clearance of the worm shaft over its lifetime fluctuates to a lesser degree. When referring to the expected ambient humidity profile, for example, it means the humidity profile of a territorial area in which the vehicle with the steering system is to be used. In other words, the relative humidity of the worm wheel is acclimatized to a local weather zone.

According to one embodiment of the invention, the limiting device comprises a clearance adjusting device, by means of which the abutment of the limiting device is adjustable. This allows the clearance of the worm shaft to be easily adapted to different requirements. Accordingly, it is not necessary to create a different limiting device for each application.

Preferably, the pre-tensioning device comprises a force adjusting device by means of which the pre-tensioning force is adjustable. This allows the pre-tensioning force acting on the worm shaft to be adapted conforming to different requirements in a simple manner. Accordingly, it is not necessary to create a different pre-tensioning device for each application.

A further aspect of the invention provides that the defined pre-tensioning force is between 8 N and 12 N, preferably about 10 N. It has been proved that this range for the pre-tensioning force jointly with the limiting device is particularly advantageous in relation to the development of unwanted noise, although this force range in the prior art corresponds to a low pre-tensioning force.

According to one embodiment of the invention, it is provided at least one damping device acting radially on the bearing element. Preferably, the damping device acts bidirectional radially on the bearing element. Due to the damping device the pivoting movement of the worm shaft is damped, thus, the generation of disturbing noise is attenuated. The term "bidirectional radially" is understood to mean that the damping device damps both the pivoting movement that displaces the worm wheel away from the worm shaft, and the pivoting movement that brings the worm wheel closer.

A bidirectional, radial damping is particularly advantageous when the disturbances that create the pivoting movements exceed a certain frequency. In this case, the worm shaft is held by the damping in the vicinity of the minimum deflection, that is, close to the position in which the worm shaft would be located without the pre-tensioning force. This reduces noise, for example, when the determined abutments interact with the clearance of the worm shaft.

One aspect of the invention provides that the guide bush and/or the limiting device comprise the damping device. For example, the guide bush comprises a damping element, in which the bearing element is received, wherein the damping element damps the movement of the bearing elements (and also a pivoting movement of the worm shaft), at least in a radial direction, in particular bidirectionally. The damping can occur for example by friction between the bearing element and damping element.

Alternatively or additionally, the limiting device may comprise a damping device, which is designed to dampen a movement of the actuator element in the radial direction of the worm shaft, in particular bidirectionally.

In particular, the damping device is designed as a viscous damper. The viscous damper is preferably designed to dampen a movement of the actuator element in the radial direction of the worm shaft, in particular bidirectionally. In this case, the damping device is preferably connected to the pre-tensioning device in parallel.

The purpose is further achieved according to the invention through a method for the production of steering systems according to one of the preceding claims, wherein the radial clearance of the worm shaft defined by the limiting device, is set, individually for each steering system, to a predefined target value at the End-of-Line process. Deviations in the clearance of the worm shaft, which may occur for example due to manufacturing tolerances of the individual parts of the steering system during the manufacturing process, can be compensated in a simple manner, since the clearance is individually adjusted for every produced steering system after the assembly of all the parts.

Preferably, the following steps are provided: the pre-tensioning force is adjusted to a predefined value, the radial clearance of the worm shaft is measured, the radial clearance is adjusted to the predefined target value for the radial clearance, then, the two preceding steps are repeated until the target value for the radial clearance is achieved. By "until the target value for the radial clearance is achieved" is to be understood that the measured value deviates less than a predefined error tolerance from the target value, for example, less than 5%, in particular less than 1%. Due to the iterative adjustment of the clearance a particularly high accuracy for the adjusted clearance is guaranteed.

In one embodiment of the invention, the radial clearance is set based on ambient temperature and/or ambient humidity, in particular, based on an expected ambient temperature profile and/or an expected ambient humidity profile. The worm shaft and/or the worm wheel can expand or contract depending on the temperature and ambient humidity, by means of which the clearance of the worm shaft changes. When setting a suitable clearance for the worm shaft, the influence of these ambient parameters is reduced or even eliminated. When referring to the expected ambient temperature profile and the expected ambient humidity profile, for example, it means the temperature or humidity profile of a territorial area in which the vehicle with the steering system is to be used. In other words, the clearance of the worm shaft is adjusted to a local weather zone.

The purpose is also achieved according to the invention through a test system for performing a method described above. The test system comprises a steering system described above and a measuring device, wherein the measuring device is designed to measure a radial clearance of the worm shaft, in particular in a contactless manner. A contactless measurement of the clearance allows a particularly high accuracy, since the clearance is not influenced by contact with a measuring tip or the like. With regard to other benefits, please refer to the above explanations.

BRIEF DESCRIPTION OF THE DRAWINGS

These and other features and advantages of the present disclosure will be apparent from the following detailed description, best mode, claims, and accompanying drawings in which:

DETAILED DESCRIPTION

Figure 1:
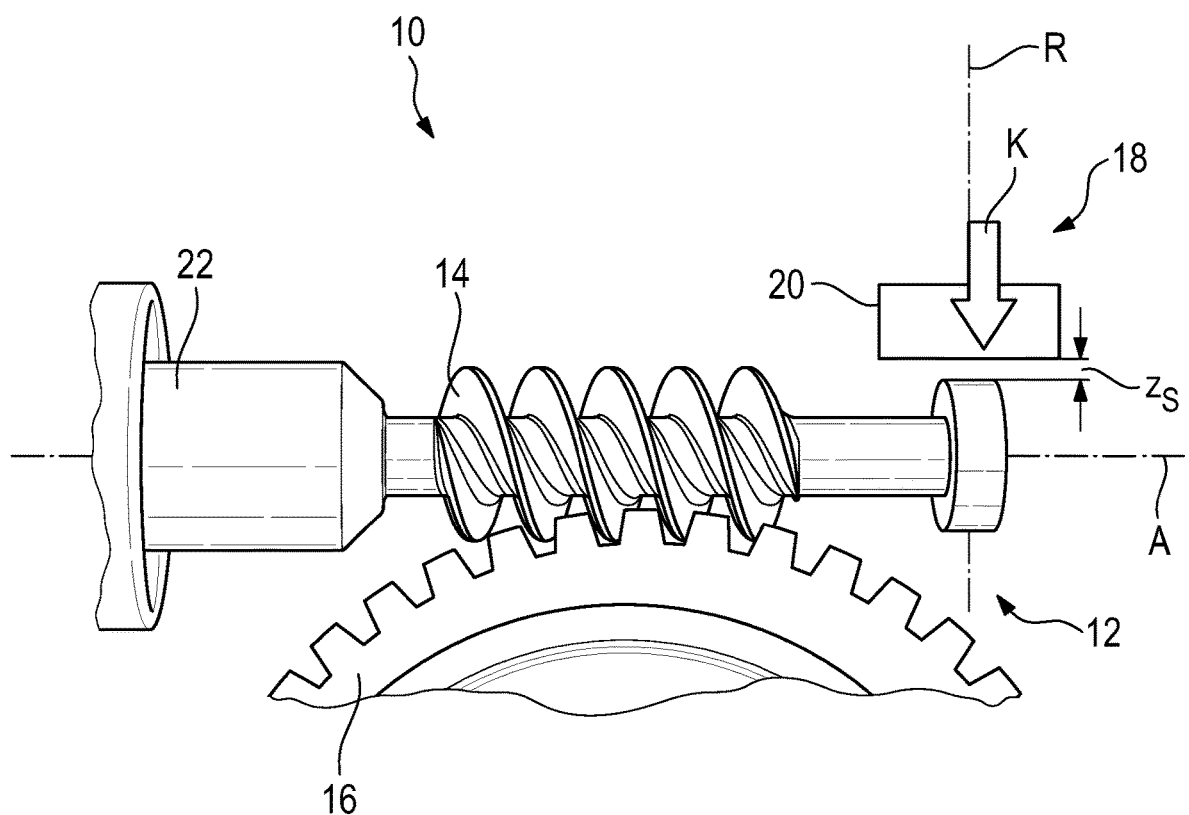
FIG. 1 shows schematically a part of a steering system according to the invention according to a first variant.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Preferred embodiments of the present disclosure are described below with reference to the accompanying drawings. However, the disclosure is not limited to the embodiments disclosed herein. All modifications within the appended claims and equivalents relative thereto are intended to be encompassed in the scope of the claims.

FIG. 1 shows schematically a first variant for an electric power steering system 10. The steering system 10 comprises a worm gear 12 having a worm shaft 14 and a worm wheel 16, and also a pre-tensioning device 18 having a limiting device 20. The worm shaft 14 comprises an end 22 (not shown) associated with the electric motor, wherein the electric motor is connected to the worm shaft 14 and thus also to the worm wheel 16 in a force-transmitting manner. The electric motor includes in particular an auxiliary motor of the steering system 10. The worm wheel 16 is coupled to a steering column or a rack of the steering system 10 in a force-transmitting manner. So, this includes an electric power steering system 10 with a steering column drive or rack and pinion drive.

In FIG. 1, the basic operation of the steering system 10 is already indicated, more specifically related to the pre-tensioning device 18 and the limiting device 20. The pre-tensioning device 18 is designed to act upon the worm shaft 14 with a pre-tensioning force K in the direction of the worm wheel 16, while the limiting device 20 defines a radial clearance $z_S$ of the worm shaft 14, as explained below with reference to FIGS. 2 and 3 in more detail. By "clearance $z_S$" is to be understood here and below a maximum amplitude of a radial pivoting movement of the worm shaft 14.

Figure 2:
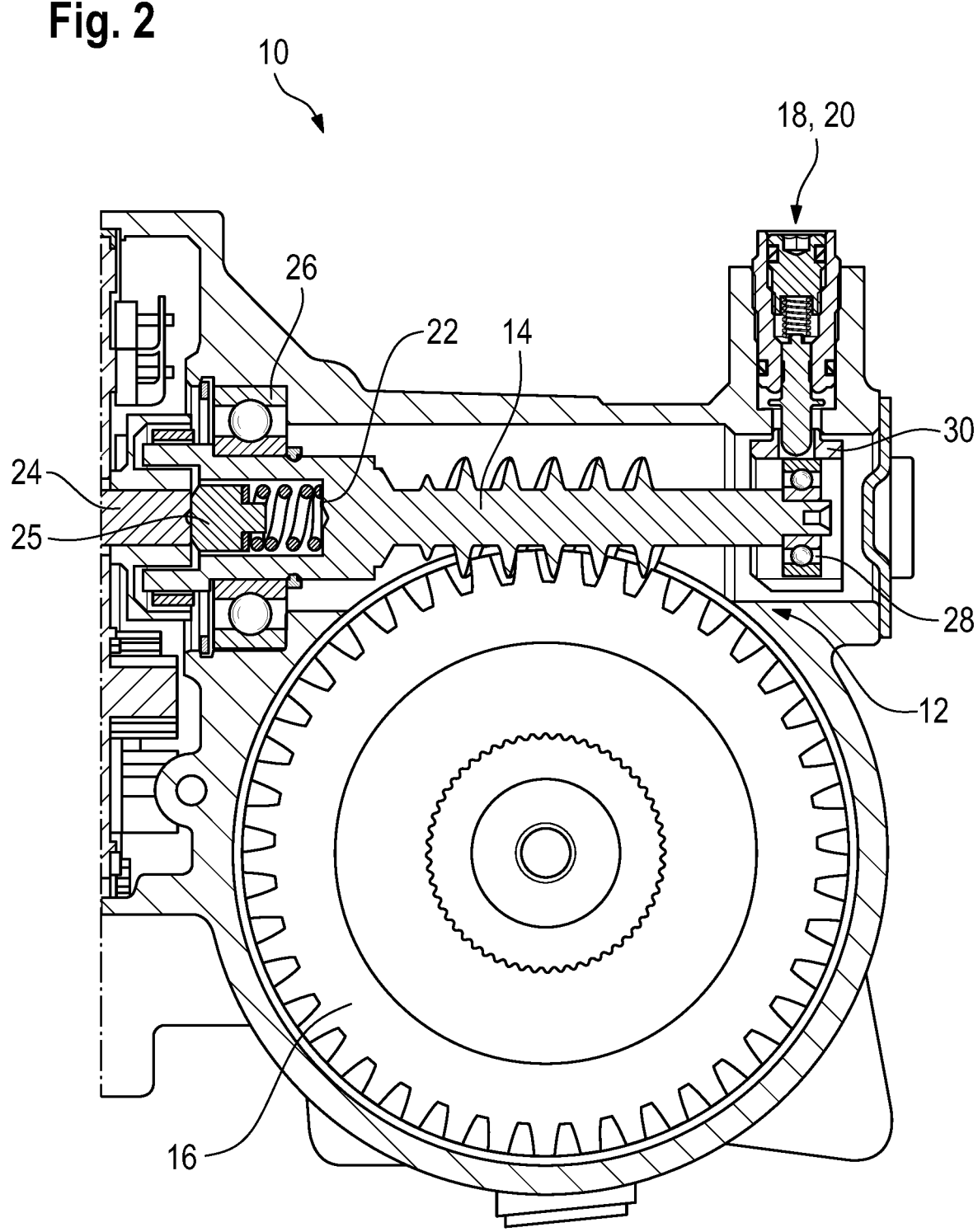
FIG. 2 shows a cross section of the steering system of FIG. 1 according to the invention.

FIG. 2 shows a cross section of the steering system 10. By comparison with FIG. 1 a motor shaft 24 of the electric motor can be seen here, which is coupled to the worm shaft 14 via a coupling element 25 in a force-transmitting manner. The worm shaft 14 is rotatably mounted about its axial direction A by means of a fixed bearing 26, but it is non-displaceably mounted along its axial direction A. Furthermore, the fixed bearing 26 allows a pivoting movement of the worm shaft 14 about a central point of the fixed bearing 26 at least in a plane that is defined by the worm wheel 16 (this plane is essentially coincident with the plane of FIGS. 2 and 3 together).

Figure 3:
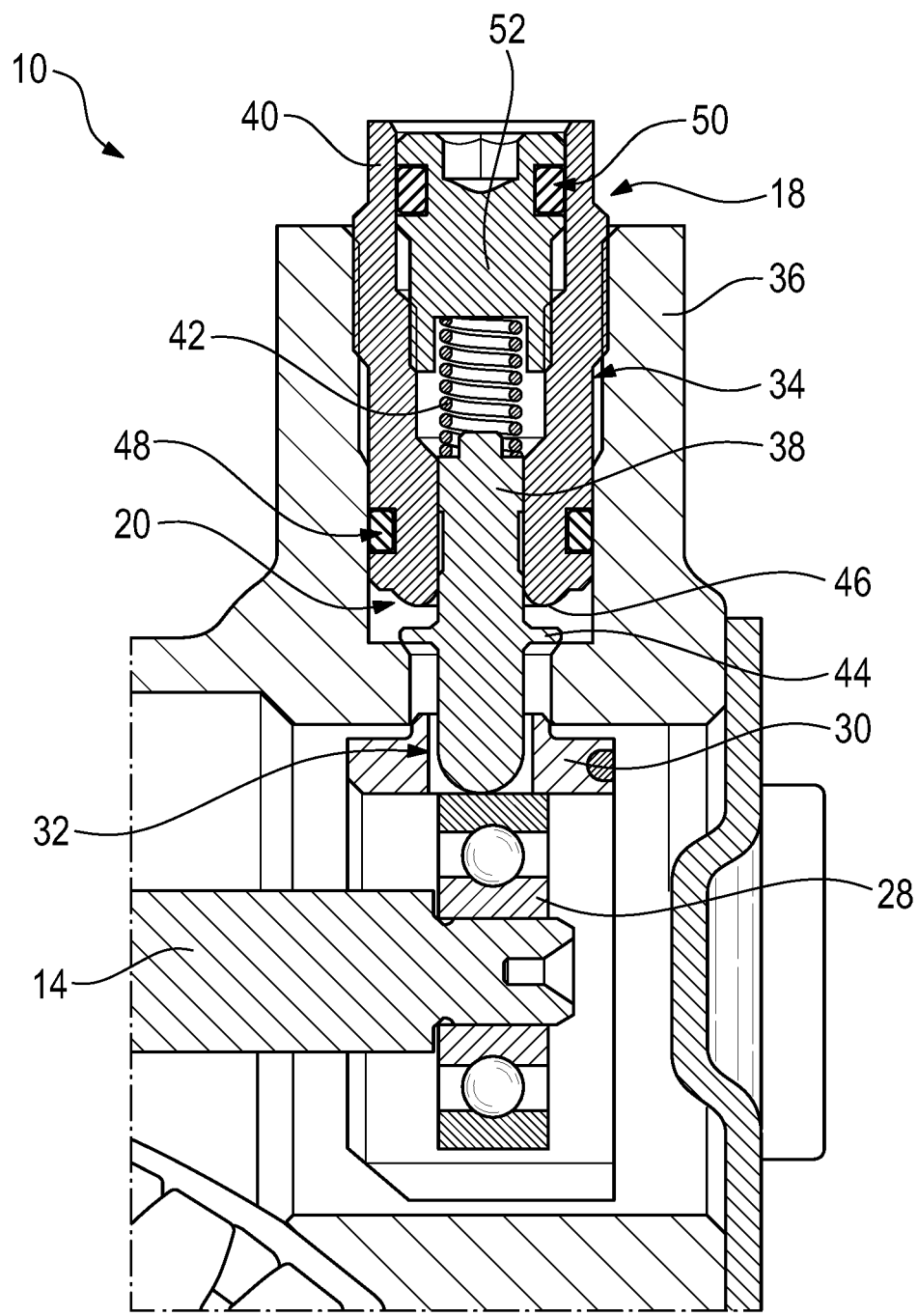
FIG. 3 shows a detail view of the steering system of FIG. 2 according to the invention.

FIG. 3 shows a detailed view of the range of the free end associated with the worm shaft 14 of the steering system 10. At the opposite end of the end 22 of the worm shaft 14, a bearing element 28 is arranged on the worm shaft 14, which is designed as a floating bearing. The bearing element 28 allows both the pivoting movement of the worm shaft 14 in the plane defined by the worm wheel 16 (in this case drawing plane), and also the rotational movement of the worm shaft 14 about its axial direction A. More specifically, the bearing element 28 performs a pivoting movement together with the worm shaft 14. The bearing element 28 is received in a guide bush 30. The guide bush 30 guides the bearing element 28 and also the worm shaft 14 during the pivoting movement in the plane defined by the worm wheel 16.

Figure 4:
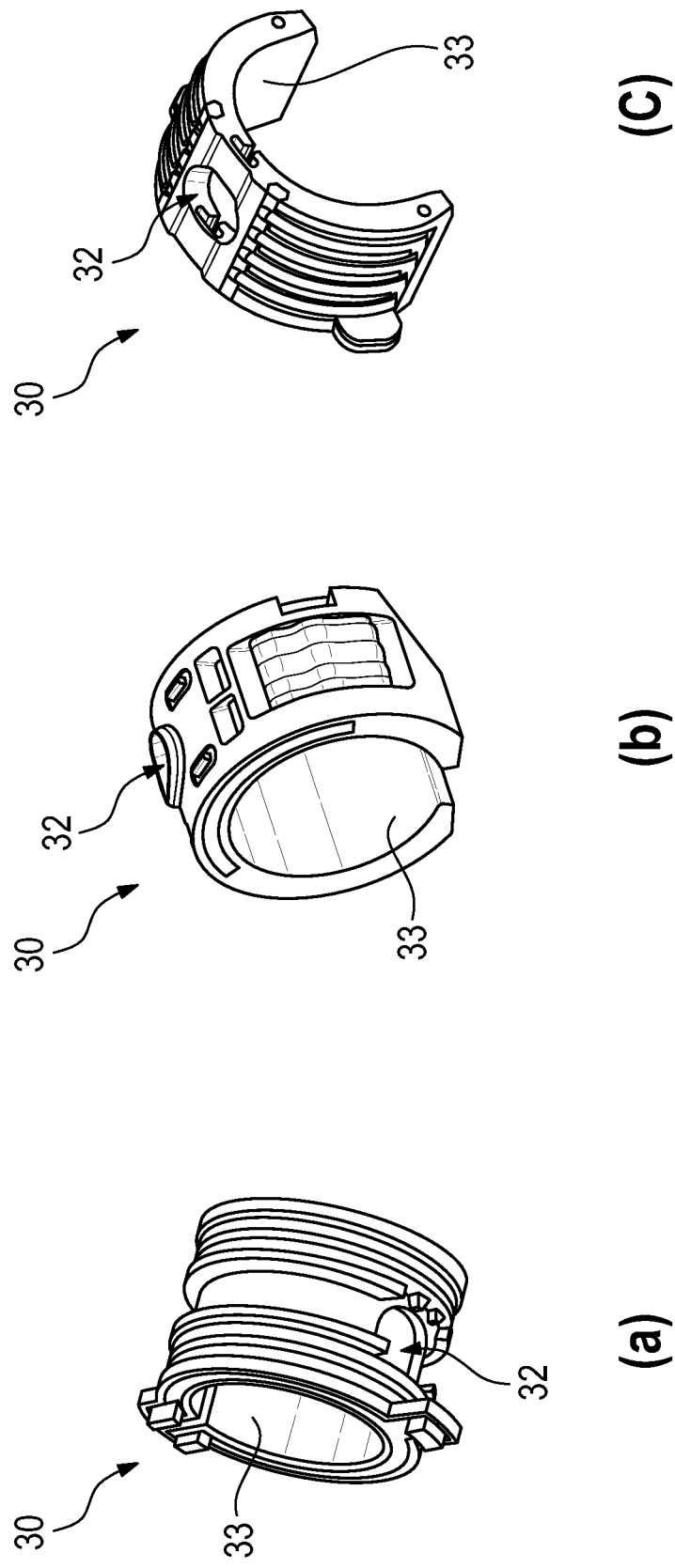
FIG. 4 shows (a) to (c) different variants for a guide bush of a steering system according to the invention.

In FIGS. 4 (a) to (c) different variants for the guide bush 30 are shown. The guide bush 30 has a radial passage opening 32 on its peripheral side. In particular, the guide bush 30 is formed as a c-Ring. Preferably, the guide bush 30 comprises on its inner side a damping element 33, in which the bearing element 28 is received, wherein the damping element 33 damps a movement of the bearing element 28 (and thus a pivoting movement of the worm shaft 14) at least in a radial direction, in particular bidirectionally. The damping can occur for example by friction between the bearing element 28 and damping element 33. The term "bidirectionally" is understood to mean that the damping element 33 damps both the pivoting movement that displaces the worm wheel 14 away from the worm shaft (16), and the pivoting movement that brings the worm wheel closer.

The pre-tensioning device 18 forms, as can be seen particularly well in FIG. 3, a separately produced part and is inserted into a recess 34 of a housing portion 36, wherein the recess extends in the range of the axial extension of the guide bush 30 in the radial direction R. The pre-tensioning device 18 comprises an actuator element 38, which is acted on via a spring element 42 arranged in a basic body 40 of the pre-tensioning device 18, with the pre-tensioning force K. The actuator element 38 extends through the passage opening 32 of the guide bush 30, and transmits the pre-tensioning force K to the bearing element 28 and thus to the worm shaft 14. The pre-tensioning force K is between 8 N and 12 N, preferably approximately 10 N, i.e., 10 N±5%.

Further, the pre-tensioning device 18 comprises the limiting device 20, which includes in this case interconnected abutments 44, 46 located on the actuator element 38 and on the basic body 40, and therefore such limiting device limits the movement of the worm shaft 14. A distance between the abutments 44, 46 (measured while the steering system 10 is in a state, in which the worm shaft 14 is maximally deflected due to the pre-tensioning force K and in which the electric motor does not act on the worm shaft 14 with a force) defines the clearance $z_S$ of the worm shaft 14 with respect to the pivoting movement.

The limiting device 20 also comprises a clearance adjusting device 48, by means of which the relative position of the two abutments 44, 46 is adjustable. In the shown variant of the steering system 10, the clearance adjusting device is formed 48 by means of interlocking threads located on an outer side of the basic body 40 and on an inner side of the housing portion 36. Optionally, the pre-tensioning device 18 comprises a force adjusting device 50, by means of which the pre-tensioning force K is adjustable. In the shown variant of the steering system 10, the force adjusting device 50 is formed by interlocking threads located on an inner side of the basic body 40 and on an outer side of a threaded bolt 52, wherein the threaded bolt 52 is connected to the spring element 42.

Via the clearance adjusting device 48 and the force adjusting device 50, the clearance $z_S$ or the pre-tensioning force K can be adjusted and/or synchronized, on the one hand to suppress the development of disturbing noises, and on the other hand, to keep the friction between worm shaft 14 and worm wheel 16 as low as possible. The clearance $z_S$ is then set in a manner that the worm shaft 14 and the worm wheel 16 can not become disengaged.

On the other hand, preferably the clearance $z_S$ is essentially equal to the deflection of the worm shaft 14 due to the pre-tensioning force K. Then, the clearance and the deflection are measured while the steering system 10 is in a state, in which the worm shaft 14 is maximally deflected due to the pre-tensioning force K and in which the electric motor does not act on the worm shaft 14 with a force.

The clearance $z_S$ depends on several parameters. The worm shaft 14 and/or the worm wheel 16 can expand or contract, for example, depending on the temperature and ambient humidity, by means of which the clearance $z_S$ of the worm shaft 14 is changed. Then it can be provided that the distance between the abutments 44, 46 is set based on an ambient temperature and/or ambient humidity, in particular, based on an expected ambient temperature profile and/or an expected ambient humidity profile. When referring to the expected ambient temperature profile and the expected ambient humidity profile, for example, it means the temperature or humidity profile of a territorial area in which the steering system 10 is to be used. In other words, the clearance $z_S$ of the worm shaft 14 is adjusted to a local weather zone.

The worm wheel 16 may consist of a plastic. Preferably, a relative humidity of the plastic material is acclimatized to an expected ambient humidity, in particular to the expected ambient humidity profile. When referring to the expected ambient humidity profile, for example, it means the humidity profile of a territorial area in which the steering system 10 is to be used. In other words, the relative humidity of the worm wheel 16 is acclimatized to a local weather zone.

Figure 5:
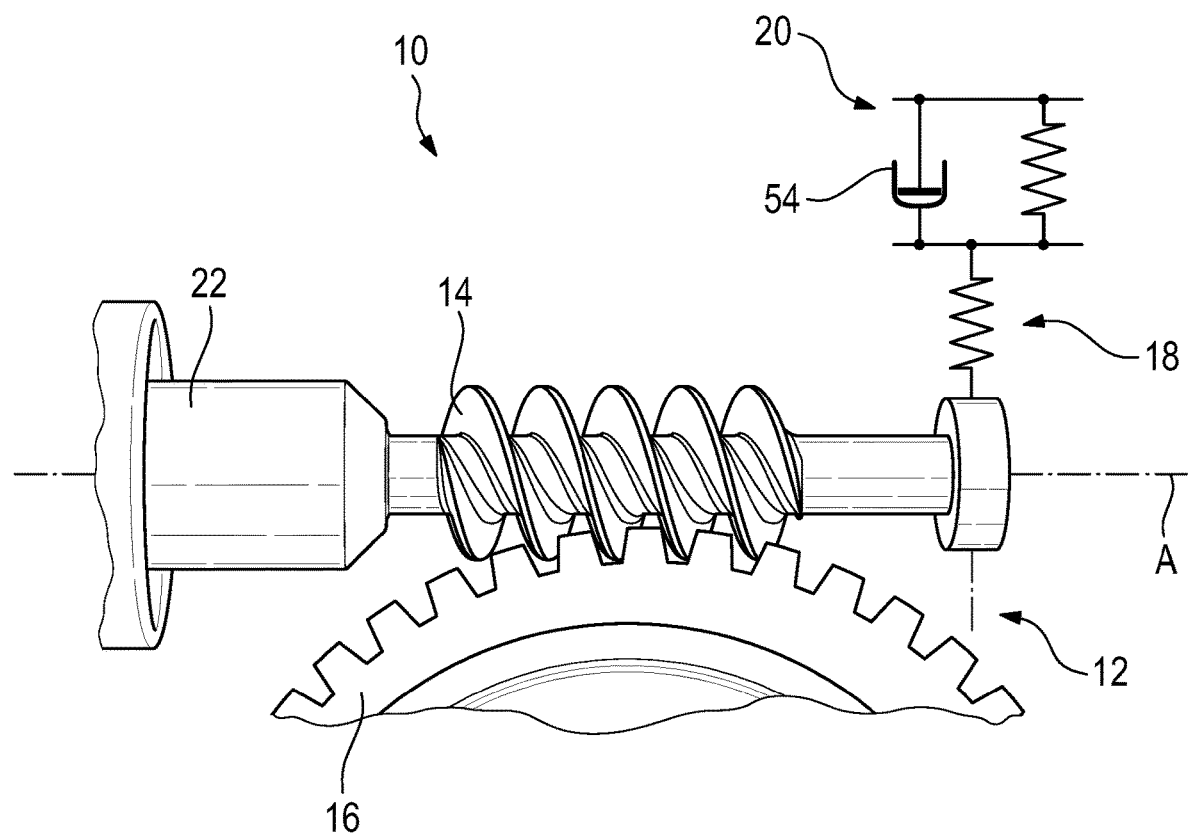
FIG. 5 shows a detail view of the steering system of FIG. 4 according to the invention.
Figure 6:
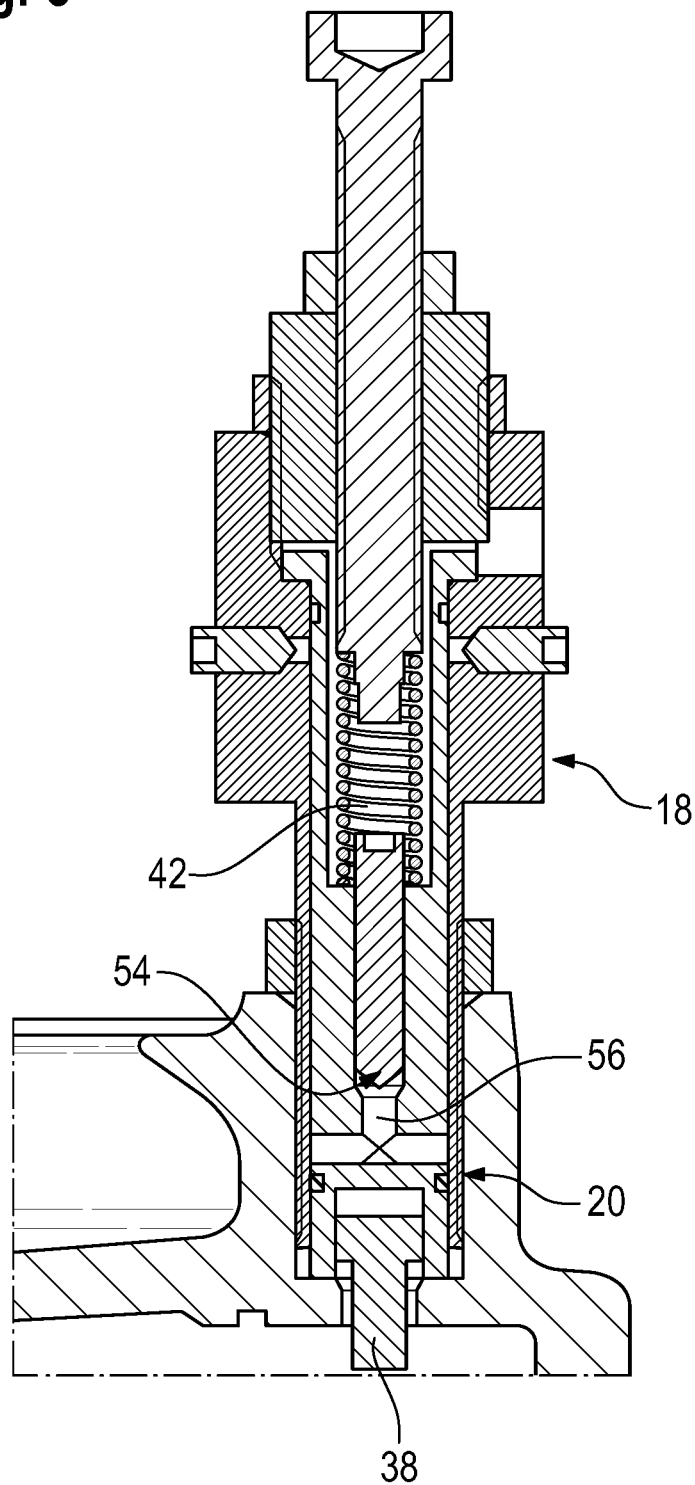
FIG. 6 shows a test system according to the invention.

FIG. 5 schematically shows a further variant of the steering system 10, in which only the differences with respect to the above-described variant are described below. For functionally identical components, the same reference numerals are used.

The difference to the above-described variant of the steering system 10 essentially corresponds to the configuration of the pre-tensioning device 18, more precisely, to the configuration of the limiting device 20.

Alternatively, or in addition to the abutments 44, 46, the limiting device in this case comprises a damping device 54, which is designed in particular as a viscous damper. The actuator element 38 is then acted on by a fluid 56 of constant viscosity of the spring element 42, so that a modified and effective pre-tensioning force K occurs, depending on the speed of a pivoting movement of the worm shaft 14. The damping device 54 then damps the pivoting movement of the worm shaft in the radial direction R, preferably bidirectionally.

Figure 7:
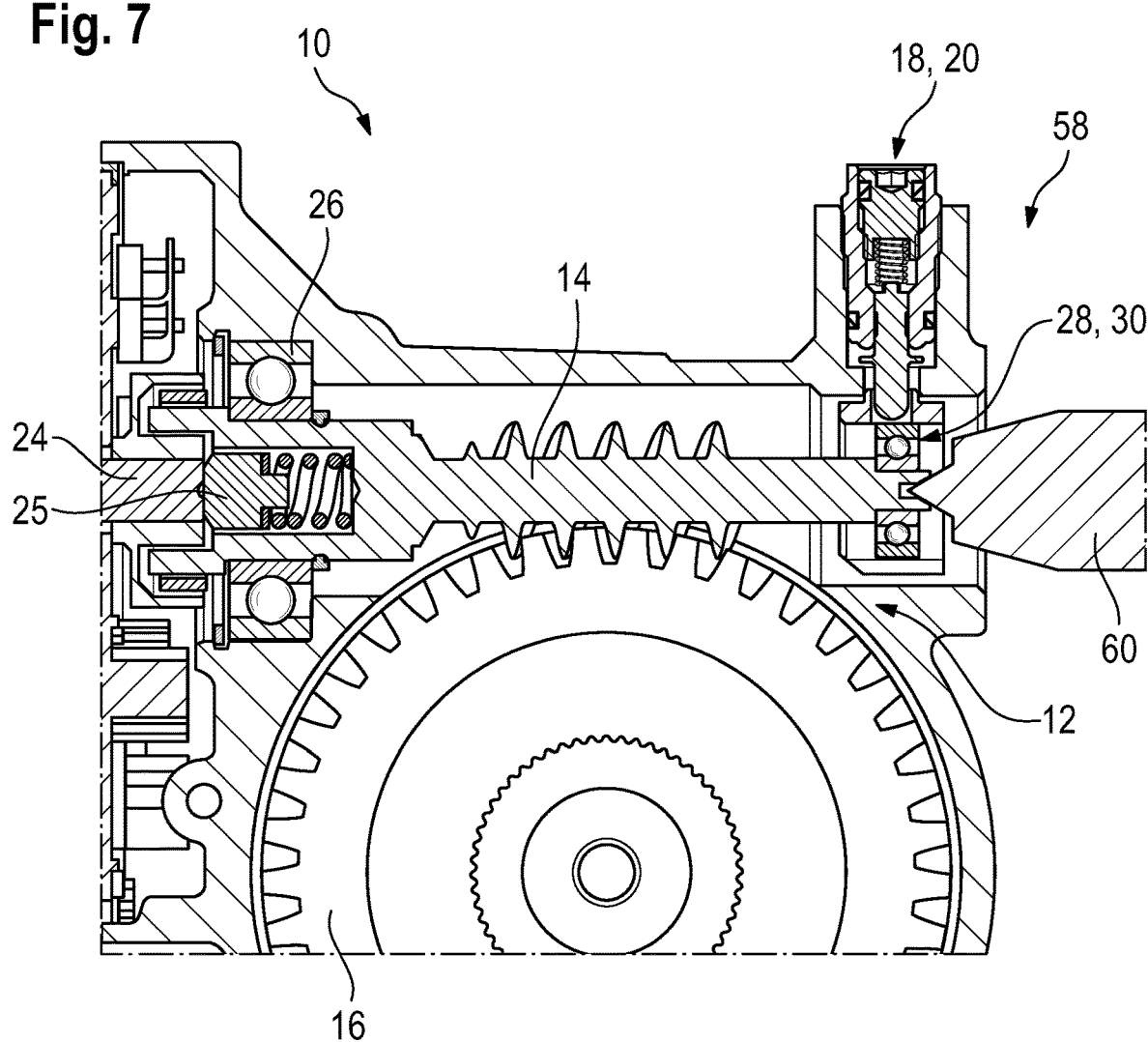
FIG. 7 shows schematically a part of a steering system according to the invention according to a second variant.
Figure 8:
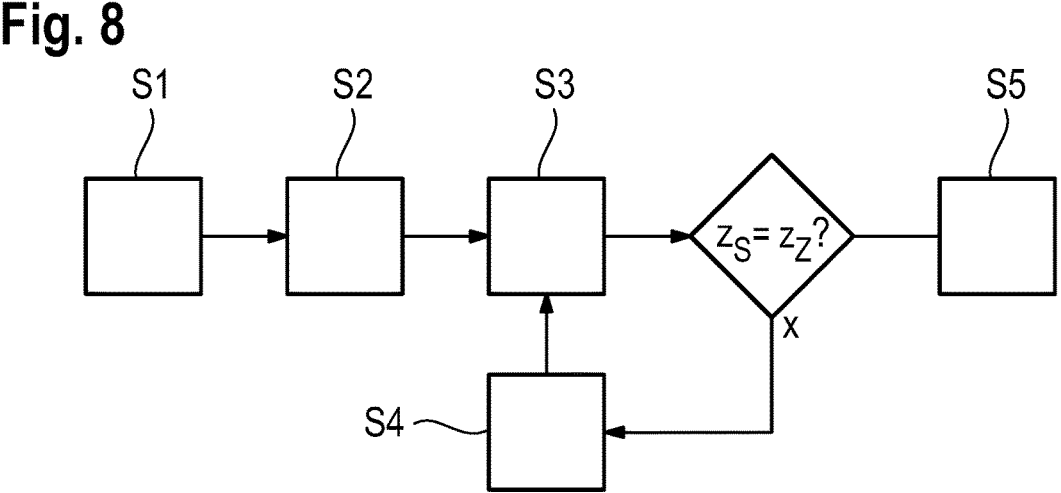
FIG. 8 shows schematically a sequence diagram of a process according to the invention for the production of steering systems.

FIG. 7 shows a test system 58 for the above-described steering system 10, with a measuring device 60. The measuring device 60 is designed to measure a radial clearance $z_S$ of the worm shaft 14, in particular in a contactless manner. Furthermore, the test system 58 is designed to perform at least one step of a method for the production of steering systems, described below with reference to FIG. 8.

After assembling all components of the steering system 10 (step S1) for each produced steering system (10) at the End-of-Line process, the following steps are performed. First, the pre-tensioning force K is set to a predefined value (step S2). Now, in particular by means of the measuring device 60, the radial clearance $z_S$ of the worm shaft 14 is measured (step S3). The radial clearance $z_S$ is then, in particular by means of the clearance adjustment device 48, adjusted to a predefined target value $z_Z$ (step S4). The predefined target value is essentially equal to the deflection of the worm shaft 14 due to the pre-tensioning force K. Then, the clearance $z_S$ and the deflection are measured while the steering system 10 is in a state, in which the worm shaft 14 is maximally deflected due to the pre-tensioning force K and in which the electric motor does not act on the worm shaft 14 with a force.

Optionally, the target value $z_Z$ for the pre-tensioning force, K is adjusted, based on an ambient temperature and/or ambient humidity, in particular based on an expected ambient temperature profile and/or an expected ambient humidity profile, as already explained above. The two preceding steps, i.e. steps S3 and S4 are repeated until the target value $z_Z$ for radial clearance is achieved. By "until the target value for the radial clearance is achieved" is to be understood that the measured value of the clearance $z_S$ deviates less than a predefined error tolerance from the target value, for example, less than 5%, in particular less than 1%. If the predefined target value $z_Z$ is achieved, the calibration of the clearance is terminated (step S5).

What is claimed:

1. An electric power steering system, comprising:
    a worm gear comprising a worm shaft and a worm wheel, wherein an electric motor is associated with the worm shaft, which is connected to the worm shaft in a force-transmitting manner,
    a bearing element, arranged on the worm shaft, at the end of the worm shaft facing away from the electric motor,
    a guide bush, in which the bearing element is received, wherein the guide bush has, on its circumferential side, a passage opening, and
    a pre-tensioning device comprising a spring-loaded actuator element extending through the passage opening of the guide bush and acting on the worm shaft in the direction of the worm wheel with a defined pre-tensioning force,
    wherein the pre-tensioning device comprises a limiting device, which is adapted to limit a pivoting movement that displaces the worm wheel away from the worm shaft, the limiting device and the actuator element each comprising an abutment, a distance between the abutments being set based on an ambient temperature or an ambient humidity, the abutments in mutual contact limiting the pivoting movement that displaces the worm wheel away from the worm shaft.

2. The electric power steering system according to claim 1 wherein the distance between the abutments is essentially equal to the deflection of the worm shaft due to the defined pre-tensioning force.

3. The electric power steering system according to claim 1 wherein the ambient temperature is an expected ambient temperature profile, the ambient humidity being an expected ambient humidity profile.

4. The electric power steering system according to claim 1 wherein the worm wheel consists of a plastic material, wherein a relative humidity of the plastic material is acclimatized to an expected ambient humidity.

5. The electric power steering system according to claim 4 wherein the expected ambient humidity is an expected ambient humidity profile.

6. The electric power steering system according to claim 1 wherein the limiting device comprises a clearance adjusting device, by means of which the abutment of the limiting device is adjustable.

7. The electric power steering system according to claim 1 wherein the pre-tensioning device comprises a force adjusting device by means of which the pre-tensioning force (K) is adjustable.

8. The electric power steering system according to claim 1 wherein the defined pre-tensioning force (K) is between 8 N and 12.

9. The electric power steering system according to claim 1 wherein it is provided at least one damping device acting radially on the bearing element, in particular wherein the damping device acts bidirectional radially on the bearing element.

10. The electric power steering system according to claim 1 wherein the guide bush is the damping device.

11. The electric power steering system according to claim 10 wherein the damping device is formed as a viscous damper.

12. A method for the production of steering systems comprising the steps of:
    Adjusting the pre-tensioning force (K) to a predefined value;
    Measuring the radial clearance ($z_S$) of the worm shaft;
    Adjusting the radial clearance ($z_S$) to the predefined target value ($z_Z$) for the radial clearance ($z_S$), the predefined target value ($z_Z$) for the radial clearance ($z_S$) being set based on an ambient temperature and/or an ambient humidity; and
    Repeating the previous two steps until the target value ($z_Z$) for the radial clearance ($z_S$) is achieved.

13. The method according to claim 12 wherein the ambient temperature is an expected ambient temperature profile, the ambient humidity being an expected ambient humidity profile.

14. An electric power steering system, comprising:
    a worm gear comprising a worm shaft and a worm wheel, wherein an electric motor is associated with the worm shaft, which is connected to the worm shaft in a force-transmitting manner,
    a bearing element, arranged on the worm shaft, at the end of the worm shaft facing away from the electric motor,
    a guide bush, in which the bearing element is received, wherein the guide bush has, on its circumferential side, a passage opening, and
    a pre-tensioning device comprising a spring-loaded actuator element extending through the passage opening of the guide bush and acting on the worm shaft in the direction of the worm wheel with a defined pre-tensioning force, the defined pre-tensioning force being between 8 N and 12 N,
    wherein the pre-tensioning device comprises a limiting device, which is adapted to limit a pivoting movement that displaces the worm wheel away from the worm shaft, the limiting device and the actuator element each comprising an abutment, the abutments in mutual contact limiting the pivoting movement that displaces the worm wheel away from the worm shaft.

15. The electric power steering system according to claim 14 wherein the worm wheel consists of a plastic material, wherein a relative humidity of the plastic material is acclimatized to an expected ambient humidity.

16. The electric power steering system according to claim 14 wherein the limiting device comprises a clearance adjusting device, by means of which the abutment of the limiting device is adjustable.

17. The electric power steering system according to claim 14 wherein the pre-tensioning device comprises a force adjusting device by means of which the pre-tensioning force (K) is adjustable.

18. A method for producing the electric power steering system of claim 14, the method comprising:
    adjusting the pre-tensioning force (K) to a predefined value;
    measuring a radial clearance ($z_S$) of the worm shaft;
    adjusting the radial clearance ($z_S$) to a predefined target value ($z_Z$) for the radial clearance ($z_S$); and
    repeating the previous two steps until the target value ($z_Z$) for the radial clearance ($z_S$) is achieved.

19. The method according to claim 18 wherein the predefined target value ($z_Z$) for the radial clearance ($z_S$) is set, based on an ambient temperature and/or an ambient humidity.

20. The method according to claim 19 wherein the ambient temperature is an expected ambient temperature profile, the ambient humidity being an expected ambient humidity profile.

* * * * *